United States Patent
Rütschle

[11] Patent Number: 5,855,541
[45] Date of Patent: Jan. 5, 1999

[54] MACHINE TOOL

[75] Inventor: Eugen Rütschle, Mühlheim, Germany

[73] Assignee: Chiron Werke GmbH & Co. KG, Germany

[21] Appl. No.: 778,189

[22] Filed: Jan. 2, 1997

[30] Foreign Application Priority Data

Jan. 3, 1996 [DE] Germany ................. 196 00 054.8

[51] Int. Cl.⁶ ........................... B23Q 3/157
[52] U.S. Cl. .................... 483/39; 483/38; 483/47
[58] Field of Search ................... 483/36, 37, 38, 483/39, 50, 51, 60, 40, 41, 42, 43, 45, 66; 414/738

[56] References Cited

U.S. PATENT DOCUMENTS

| | | | |
|---|---|---|---|
| 4,932,118 | 6/1990 | Rutschle | 483/48 |
| 5,451,196 | 9/1995 | Rutschle | 483/39 |
| 5,453,068 | 9/1995 | Rutschle et al. | 483/38 |
| 5,462,511 | 10/1995 | Sheldon et al. | 483/38 X |
| 5,514,063 | 5/1996 | Stoll et al. | 483/66 |
| 5,624,365 | 4/1997 | Haninger et al. | 483/50 |

FOREIGN PATENT DOCUMENTS

| | | |
|---|---|---|
| 25 47 819 | 4/1977 | Germany. |
| 38 31 869 A1 | 3/1990 | Germany. |
| 43 29 252 A1 | 3/1995 | Germany. |
| 34 09 682 A1 | 9/1995 | Germany. |

*Primary Examiner*—William R. Briggs
*Attorney, Agent, or Firm*—Pretty, Schroeder & Poplawski

[57] ABSTRACT

A machine tool comprises a spindle and a tool changer for conveying tool holders between a magazine position and a working position at the spindle. The tool changer has two longitudinal rods and two transverse rods that are joined to said two longitudinal rods via universal joints so as to form an articulated rectangle. Each of said two longitudinal rods is rotatably mounted in the vicinity of its respective center. The tool changer comprises two grippers for gripping said tool holders to be conveyed. Said grippers are mounted on certain of said longitudinal and transverse rods such that upon rotation of the longitudinal rods the grippers are conveyed between said magazine position and working position while substantially maintaining said tool holders in their preferably vertical orientation.

22 Claims, 5 Drawing Sheets

MACHINE TOOL

BACKGROUND OF THE INVENTION

1. Field of the Invention

The invention relates to a machine tool having a spindle and having a tool changer for conveying tool holders between a magazine position and a working position on the spindle while substantially maintaining the orientation of the tool holders, the tool holders being held in grippers provided on the tool changer.

2. Description of Related Prior Art

A machine tool of the aforementioned kind is known from U.S. Pat. No. 4,932,118.

In the known machine tool, the magazine position is located above the working position, and in a front view of the machine tool is laterally offset with respect to the working position. Two gripper arms are pivot-mounted on opposite sides of the working position. The gripper arms are moved by means of a linkage and a rocker element, so as to cross over one another, along locus curves whose common starting and end points are the magazine position and working position, respectively. When the one gripper arm is conveying a tool holder from the magazine position to the working position, the other gripper arm is bringing a tool holder from the working position to the magazine position. This known tool changer allows fast tool changing times and a compact construction for the machine tool, since the tool holders are moved past one another at relatively close distances during the changing operation.

The mechanism, consisting of the linkage and the rocker element, that leads to such locus curves is, however, of relatively complicated construction.

A further machine tool in which the transfer position and the working position lie in a common vertical plane is known from U.S. Pat. No. 5,451,196. The tool changer of this machine tool also has two gripper arms, which are coupled by means of a linkage in such a way that their locus curves run, in the region between the working position and the magazine position, at a lateral distance from the vertical plane.

This known tool changer also has a relatively complicated construction. In particular, the linkage joining the two gripper arms has a series of complex articulation arrangements.

The gripper arms of these two known machine tools are configured as parallelogram guides, so that the tool holders are conveyed from the magazine position to the working position and back while retaining their vertical orientation.

With machine tools of this kind it is generally desirable to minimize tool changing times, the intention being for the changer mechanism construction to be as compact and malfunction-resistant as possible. It is also desirable to protect the changer mechanism as far as possible from flying chips and sprayed drilling fluid.

SUMMARY OF THE INVENTION

It is therefore an object of the invention to improve the machine tool mentioned at the outset in such a way that the construction of the tool changer is as simple and compact as possible.

According to the invention, this object is achieved, in the case of a machine tool of the kind mentioned initially, by the fact that the tool changer has two longitudinal rods and two transverse rods that are joined via universal joints into an articulated rectangle; that the longitudinal rods are rotatably mounted in the vicinity of their center; and that two grippers for gripping the tool holders are mounted on the rods in such a way that upon rotation of the longitudinal rods, the grippers are conveyed between the magazine position and the working position.

The tool changer according to the invention has the advantage of an extremely simple construction with a minimum number of individual elements. The tool changer is therefore extremely malfunction-resistant. The moving masses are very small, so that high accelerations and thus fast tool changing times are achievable. The simple construction moreover makes it possible to protect the tool changer from flying material chips and sprayed drilling fluid.

In general terms, the tool changing operation is accomplished by means of a rotary motion. This constitutes an abandonment of the approach previously followed, that of achieving the tool change by means of coordinated pivot motions of two gripper arms. Because of the feature of joining the longitudinal and transverse rods of the articulated rectangle with universal or cardan joints, the rotary motion does not, contrary to expectations, cause a reversal of the orientation of the tool holders held by the grippers. Instead, the transverse rods, joined by means of cardan joints to the rotating longitudinal rods, maintain their orientation during the entire rotation operation.

The tool changer can be mounted on the machine tool by means of simple rolling bearings; complex linkages or rocker elements are not necessary.

The object underlying the invention is completely achieved in this manner.

According to a preferred embodiment, the grippers are mounted on the transverse rods.

This feature advantageously exploits the fact that the transverse rods maintain their orientation during a rotation of the longitudinal rods.

According to a particularly preferred embodiment, shafts on which the longitudinal rods are rotatable mounted are offset in parallel fashion, so that at least in an initial position, in which one transverse arm is in the vicinity of the working position and the other transverse arm in the vicinity of the magazine position, the rods constitute an articulated parallelogram.

This feature firstly results in a particularly compact construction, at least in the initial position. Secondly it is particularly easy, with a suitable orientation of the shafts on which the longitudinal rods are rotatably mounted, to displace tool holders from magazine position located vertically higher up to a working position located lower down.

Preferably the spacing between the parallel shafts is in the range between one-half and one-quarter the length of the longitudinal rods, preferably approximately one-third the length of the longitudinal rods.

With a spacing of this magnitude between the parallel shafts, the longitudinal shafts are arranged, at Least in the initial position, sufficiently close to one another to achieve a compact construction. In addition, the spacing resulting from this feature between the longitudinal rods in the initial position is sufficient so that suitably dimensioned bearings can be provided on the shafts.

According to a particularly preferred embodiment, the shafts are tilted with respect to the horizontal such that the transverse arms are oriented vertically.

Since the tool holders are as a rule held vertically both in the tool magazine and on the spindle, the advantageous result of this feature is that the tool holders, when conveyed from the working position into the magazine position and vice versa, always arrive in the right orientation. With this feature it is therefore not necessary to mount the grippers at an angle with respect to the transverse rods in order to grip the tool holders. This further minimizes the design complexity.

Preferably the shafts are tilted in a range between 10 and 30 degrees, preferably 20 degrees.

With this tilt, if it is desired to orient the transverse arms vertically and in correlation with the spacing of the parallel shafts, the axial forces occurring at the bearings of the longitudinal arms are advantageously kept within limits.

According to a preferred embodiment, the ratio between the length of the longitudinal arms and the length of the transverse arms is between 2 and 4, preferably approximately 3.

This length ratio advantageously offers a good compromise between achieving sufficient space inside the articulated rectangle to receive the bearings, minimization of the overall length and therefore weight of the rods, and manual access to the transverse elements.

According to a preferred embodiment, the shafts are joined by a coupling member.

This has on the one hand the great advantage that only one of the shafts needs to be mounted on the machine tool. If the coupling member is sufficiently rigid, this is not a problem even in terms of strength. Moreover this kind of connection between the shafts, of which only one is then mounted on the machine tool, has the advantage that if vibrations, impacts, or the like occur, the shafts always move synchronously, thus preventing jamming of the articulated rectangle constituted by the four rods.

According to a further preferred embodiment, the longitudinal rods are drive-coupled to one another.

Because of the kinematics of the articulated rectangle constituted by the four rods, when one of the longitudinal rods is driven the other longitudinal rod also moves even without such a drive coupling. The coupling has the advantage, however, that the universal joints connecting the rods must absorb almost no force. As a result the universal joints—located radially and externally—can have smaller dimensions, which helps with the desired minimization of total weight. Overall, this feature makes possible high rotary accelerations, as a result of which the tool changing time can be optimized.

In a preferred embodiment, the drive coupling is provided by a gear drive train, which is known to be able to transfer high torques with relatively little structural complexity. Other drive couplings are also conceivable, however, for example belts, chains, or the like. The decisive factor is, as mentioned, that the forces to be handled by the universal joints are minimized by means of a drive coupling of this kind.

According to a preferred embodiment, the gear drive train has a central toothed roller as well as two gears which are rigidly joined respectively to the two longitudinal rods and mesh with the central toothed roller.

A gear drive train of this kind is particularly easy to manufacture and easy, in structural terms, to introduce inside the articulated rectangle.

It is of particular advantage in this connection if the central toothed roller is mounted rotatably on the coupling member.

This feature further reduces the design complexity. The parts count is minimized.

It is also advantageous if the coupling member is hollow.

This on the one hand offers an easy way to deliver energy to the grippers to grip the tool holders. On the other hand it is possible to receive at least a portion of the gear drive train inside the coupling member, so that it is largely protected from outside influences.

Lastly, it is advantageous if the coupling member is at the same time configured as a spray shield.

With this feature the bearings for the longitudinal arms, and also portions of the gear drive train, can be largely protected from flying material chips and/or sprayed drilling fluid.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Embodiments of the invention are shown in the drawings and will be explained further in the description below. In the drawings.

DETAILED DESCRIPTION OF PREFERRED EMBODIMENTS

Figure 1:
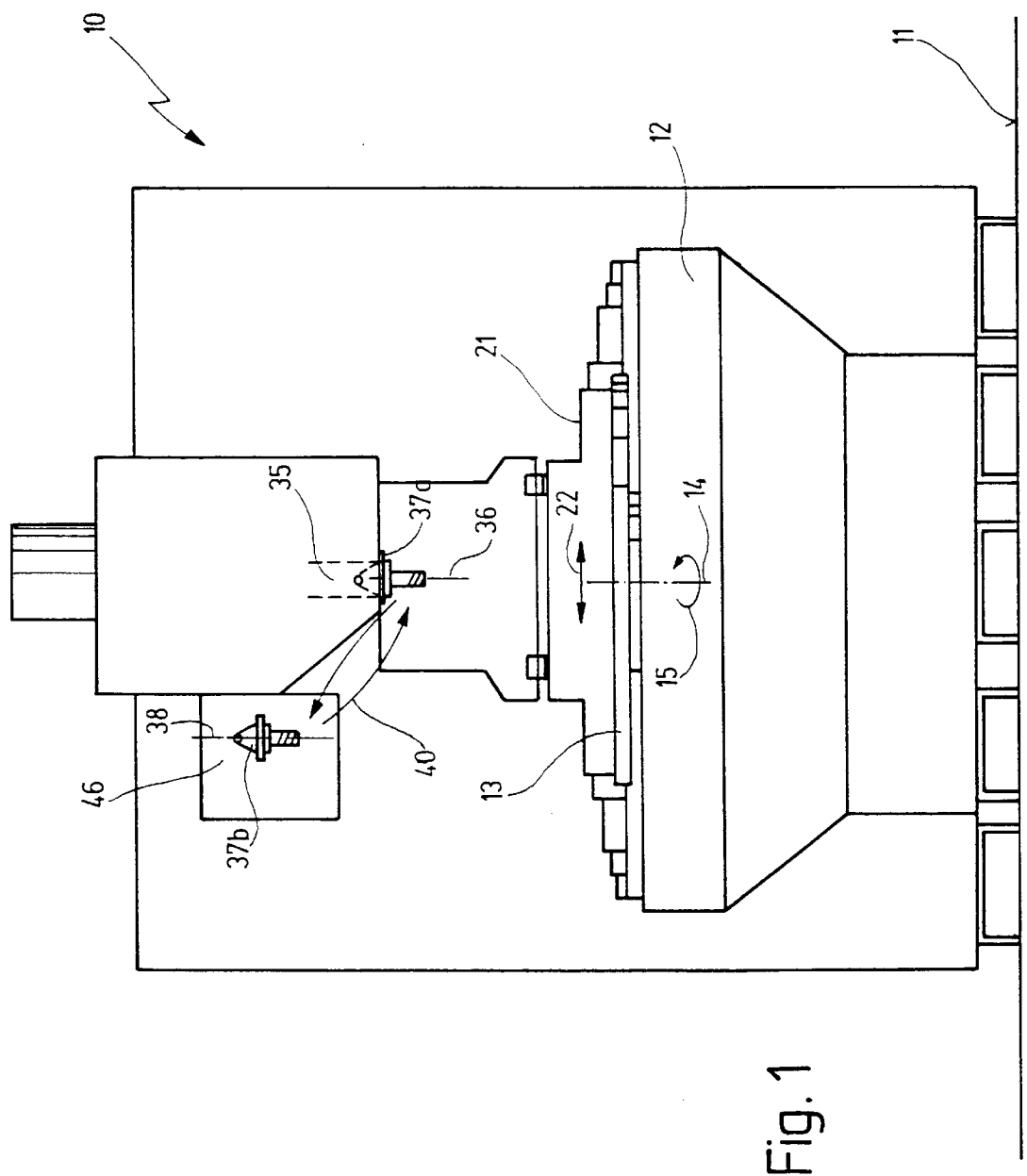
FIG. 1 shows a front view of an embodiment of a machine tool according to the invention.
Figure 2:
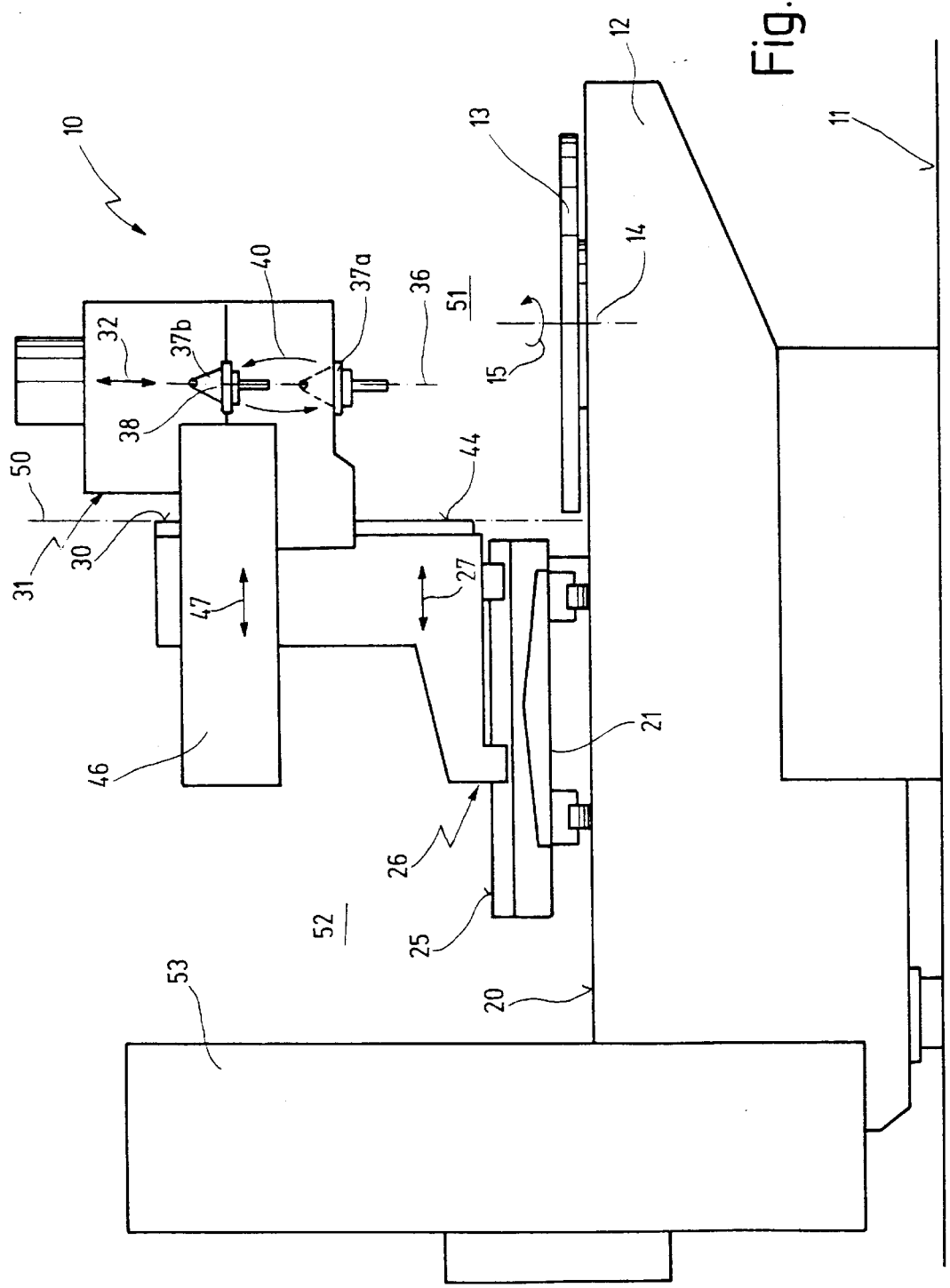
FIG. 2 shows a side view of the machine tool shown in FIG. 1.

In FIGS. 1 and 2, 10 designates the entirety of a machine tool. Machine tool 10 is a "machining center," i.e. a machine tool that preferably performs drilling and milling operations on workpieces, specifically under numerical control by a control unit. For the various machining steps in the machining center, predefined tools are selected from a tool magazine and clamped into the spindle. After completion of the machining step, the tool is changed and the next machining step is performed with the next tool.

Machine tool 10 stands on a base 11 and comprises a workpiece table 12 that, in the embodiment shown, is stationary. Machining centers having workpiece tables that can be spatially displaced are, however, also known.

A workpiece changer 13 is located on workpiece table 12. Workpiece changer 13 consists substantially of a table that is rotatable about a vertical axis 14, as indicated by an arrow 15. Workpiece changer 13 rotates 180 degrees at the beginning and end of each machining operation, so that the previously machined workpiece can be removed from the one side of workpiece changer 13 and a new, unfinished workpiece can be clamped in place while the previously clamped workpiece is being machined on the opposite side of workpiece changer 13.

With machine tool 10, the tools can be displaced relative to the workpiece along three Cartesian coordinates.

This is done first by means of a first support 20, joined to workpiece table 12, on which a first carriage 21 can be displaced in the longitudinal direction, as indicated by an arrow 22. This displacement axis is referred to as the X axis.

First carriage 21 carries a second support 25 having a guide for a second carriage 26, also referred to as a traveling column. Second carriage 26 is displaceable in a direction 27 perpendicular to the displacement direction of first carriage 21. The displacement axis of the second carriage or traveling column 26 is referred to as the Y axis.

The X axis and Y axis constitute the horizontal principal axes of machine tool 10.

Located on traveling column 26 is a third support 30 for a third carriage, which carries spindle head 31. The displacement axis of spindle head 31 extends vertically, and is referred to as the Z axis. It is indicated in FIG. 2 with an arrow 32. The Z axis constitutes the third, vertical principal axis of machine tool 10.

Located in spindle head 31 is a spindle 35 whose axis, as mentioned, extends vertically and thus defines a working position 36 for tools.

The actual tools are held in tool holders, of which 37a in FIGS. 1 and 2 designates the one that, in the situation shown, is currently located in a tool receptacle of spindle 35.

37b designates a second tool holder which is located above and (in front view) laterally offset with respect to working position 36, specifically in a transfer position or magazine position 38. Tool holders 37a and 37b are both oriented in the vertical axis.

Tool holders 37a, 37b are conveyed between working position 36 and magazine position 38 by a tool changer 40 that is only indicated schematically in FIGS. 1 and 2 and will be described more precisely later.

Located laterally on spindle head 31 at the height of magazine position 38 is a storage area 46 of a tool magazine. Storage area 46 is connected to a transport device, indicated by an arrow 47, in order to bring individual tool holders out of storage area 46 to magazine position 38, or vice versa. Storage area 46 and transport device 47 thus together constitute the tool magazine.

In the embodiment of FIGS. 1 and 2 storage area 46 is, as stated, connected to spindle head 31, and is therefore displaced together with it along all three principal axes X, Y, and Z; in technical terminology this is known as a "variable tool changing plane."

Lastly, 50 in FIG. 2 indicates that a partition, which allows complete encapsulation of the front region of machine tool 10 with respect to the rear region, can be provided approximately in the plane of front side 44 of traveling column 26. Partition 50 can, in particular, separate working space 51 for the tools from rear space 52 and the accessories located there, for example utility cabinet 53 and the like.

Figures 3, 4:
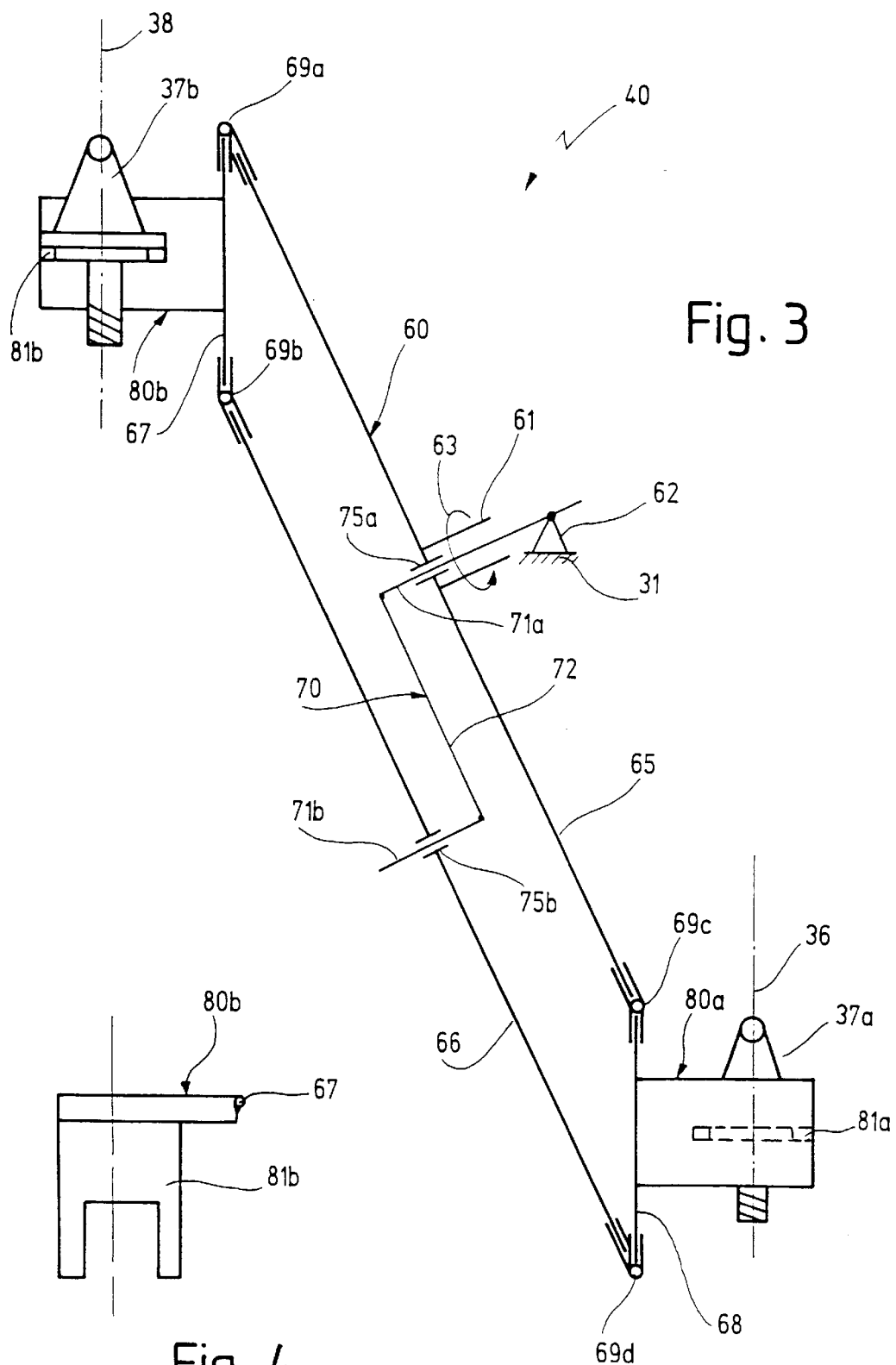
FIG. 3 shows a schematic front view of an embodiment of a tool changer of the machine tool according to the invention
FIG. 4 shows a schematic plan view of a gripper of the tool changer shown in FIG. 3.

FIG. 3 shows a schematic illustration of a tool changer 40 that is used with machine tool 10 according to the invention.

Tool changer 40 consists substantially of a rotary drive train 60 which is caused to rotate by a drive shaft 61, as indicated by an arrow 63. Rotary drive train 60 has two longitudinal rods 65, 66 and two transverse rods 67, 68, which are joined by universal joints 69a to 69d into an articulated parallelogram.

Longitudinal rods 65, 66 are each mounted in the middle, rotatably about shafts 71a, 71b, by means of bearings 75a, 75b. Shafts 71a, 71b are rigidly joined by means of a coupling member 72, and together with it constitute a coupling device 70.

In order to achieve the parallelogram arrangement of rotary drive train 60, shafts 71a, 71b are offset in parallel fashion. The top shaft 71a is rigidly joined to spindle head 31 by means of a locating bearing 62. Overall, therefore, the entire coupling device 70 is rigidly joined to spindle head 31 and is supported by it.

Shafts 71a, 71b, and thus the entire coupling device 70, are tilted with respect to the horizontal in such a way that transverse rods 67, 68 are oriented vertically. On transverse rods 67, 68, grippers 81a, 81b are located respectively on carriers 80a, 80b to grip tool holders 37a, 37b. One gripper 81b is shown extremely schematically in FIG. 4 in plan view. It is understood that means (not shown) for retaining the tool holders during the changing operation can be present on the gripper.

Rotor arrangement 60 is symmetrical, which is not necessary but is advantageous, since the forces which occur act in each case uniformly on shaft bearings 71a, 71b, ball bearings 69a–69d, and locating bearing 62.

FIG. 3 shows tool changer 40 in an initial position in which one transverse arm 67 is arranged in the vicinity of magazine position 38, and the other transverse arm 68 in the vicinity of working position 36. Tool holder 37a, shown in the working position, has in the initial position already been removed from the tool receptacle of the spindle.

Figure 5:
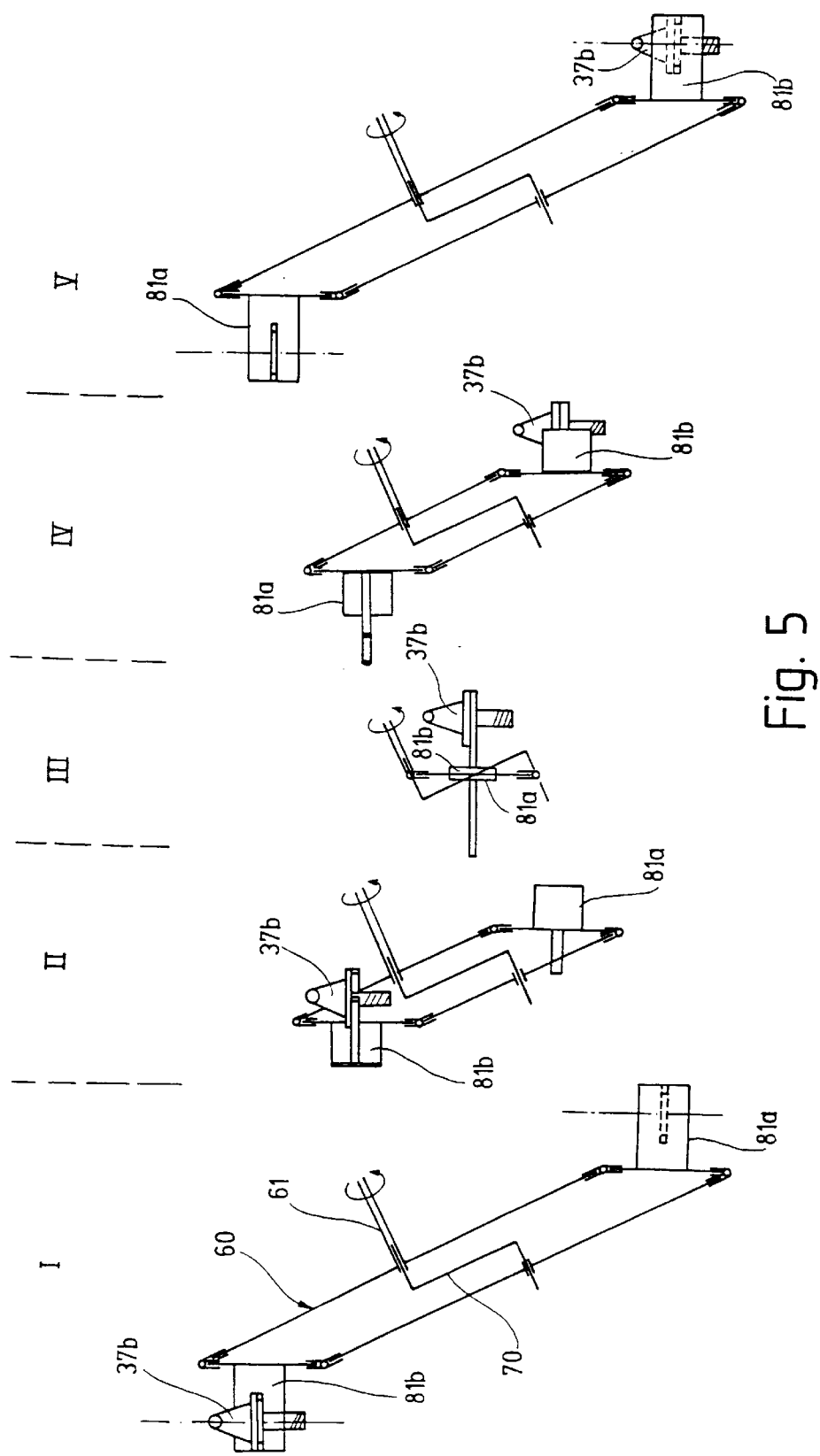
FIG. 5 shows a schematic illustration of phases during a tool changing operation with the tool changer of FIG. 3.

The operation of tool changer 40 is explained below with reference to the illustration of phases of a tool changing operation in FIG. 5. For illustrative purposes, FIG. 5 shows only one tool holder 37b, the conveying of which from the magazine position into the working position is shown with reference to phases I to V. FIG. 5 moreover shows the arrangement consisting of bearing 75a and drive shaft 61, configured as a hollow shaft, in simplified fashion.

Phase I depicted in FIG. 5 corresponds to the initial position shown in FIG. 3, in which one transverse arm is arranged in the vicinity of the working position, and the other in the vicinity of the magazine position.

After gripper 81b in magazine position 38 has picked up tool holder 37b for the next machining step and (although not shown) the tool holder for the machining step just completed has been gripped by gripper 81a, rotary drive train 60 is caused to rotate by drive shaft 61.

In phase II shown next, drive shaft 61 has completed a 45-degree rotation so that gripper 81b has moved out of the drawing plane and downward. Similarly, in phase II gripper 81a has moved slightly upward and behind the drawing plane of FIG. 5. At the same time, a rotation of the transverse rods through 45 degrees occurs due to the kinematics of rods 65 to 68, joined by means of universal joints 69a to 69d.

After a rotation of drive shaft 61 through 90 degrees (phase III), grippers 81a, 81b are at the same height; gripper 81b projects in front of the drawing plane of FIG. 5 the same distance as the rotation radius of the longitudinal rods, and gripper 81a projects behind the drawing plane by the same radius.

Phase IV shows the situation after a rotation through 135 degrees. Grippers 81a, 81b have moved back toward the drawing plane from the position shown in phase III. Gripper 81b has moved farther downward, and gripper 81a farther upward. In addition, the rotation of the transverse rods has continued; they are now rotated 135 degrees with respect to the position shown in phase I.

Phase V shows the final result of a changing operation. The situation at phase V corresponds basically to that at phase I, although now gripper 81a is arranged in the vicinity of the magazine position, and gripper 81*b* in the vicinity of the working position. In this situation tool holder 37*b* is clamped into the tool receptacle of the spindle in preparation for the next machining step, and the tool holder located in gripper 81*a* is optionally being removed for reception of a tool holder for the next machining step but one.

It is evident that the position of coupling device 70 has remained unchanged during the changing operation, while conversely rotary drive train 60 has rotated 180 degrees about coupling device 70. The transverse rods to which grippers 81*a*, 81*b* are fastened have remained vertically oriented throughout the changing operation, but because of the kinematics of the universal joints have rotated 180 degrees, which is clearly evident in FIG. 5 from a comparison of phases I and V: in phase I, tool holder 37*b* is visible in front of gripper 81*a*, while in phase V it is concealed by the latter.

Figure 6:
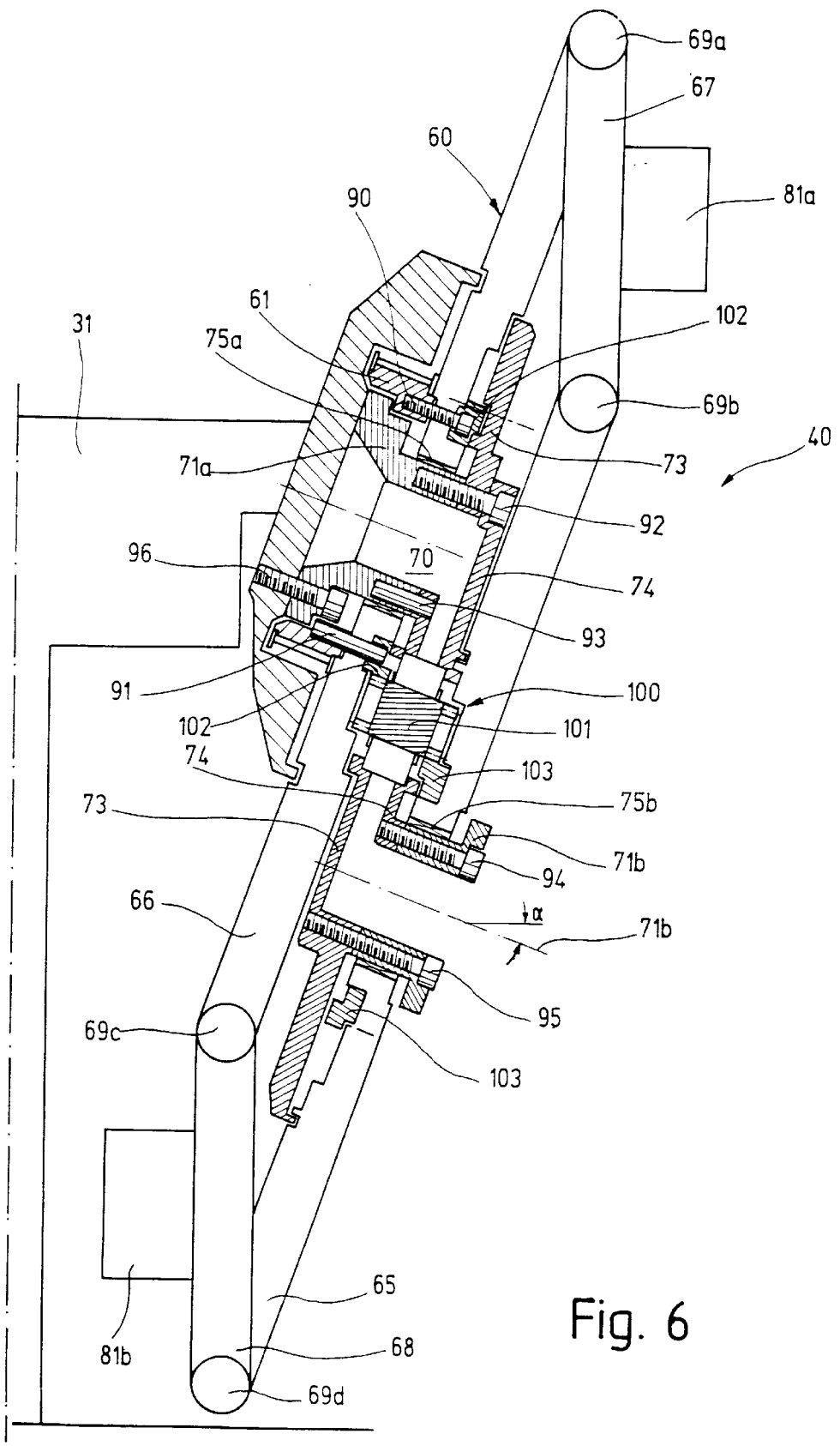
FIG. 6 shows a further embodiment of a tool changer of the machine tool according to the invention.

FIG. 6 shows a further embodiment of a tool changer 40 of the machine tool according to the invention. FIG. 6 is a sectioned representation; crosshatching of rods 65 to 68 was omitted for reasons of clarity.

The basic construction and operation of this tool changer do not differ from those of the embodiment shown in FIG. 3. To this extent, identical parts are given identical reference numbers. This embodiment does, however, differ from the embodiment shown in FIG. 3 in terms of the particular configuration of coupling device 70, and by the fact that a gear drive train 100 is provided in order to drive-couple the two longitudinal rods 65, 66 to one another.

Coupling device 70 has two shafts 71*a*, 71*b*, configured as hollow shafts, for mounting longitudinal rods 65, 66. Shafts 71*a*, 71*b* are rigidly joined to one another by two rigidly joined coupling disk elements 73, 74.

Longitudinal rod 66, at the top in FIG. 6, is rigidly joined by means of a bolt 90 and a pin 91 to drive shaft 61, which is configured here as a belt pulley. Shaft 71*a* is rigidly fastened to spindle head 31 by a series of bolts, of which only one 96 is shown in FIG. 6. Shafts 71*a*, 71*b* and coupling disk element 73, 74 are rigidly joined to one another by bolts 92, 94, 95 and a pin 93.

The two coupling disk elements 73, 74 constitute a cavity that is joined to the cavities of hollow shafts 71*a*, 71*b*. Cables or hoses can be guided through these cavities to supply energy, in particular for grippers 81*a*, 81*b*; this is not shown in FIG. 6.

Lastly, a central toothed roller 101 is arranged in the cavity constituted by coupling disk elements 73, 74, and rotatably mounted on coupling disk elements 73, 74. Toothed roller 101 has at each end a gear that emerges from the cavity constituted by coupling disk elements 73, 74. These are in meshed engagement with gears 102, 103 which are fastened onto longitudinal rods 65 and 66, respectively. By means of gear drive train 100, a rotary motion imparted to longitudinal rod 66 by means of drive shaft 61 is also imparted directly to longitudinal rod 65. The result of this is that universal joints 69*a* to 69*d* do not need to transfer any force during the rotation operation, in particular during acceleration and deceleration.

I claim:

1. A machine tool, comprising
   a spindle; and
   a tool changer having two longitudinal rods and two transverse rods that are joined to said longitudinal rods via universal joints so as to form an articulated rectangle, each of said two longitudinal rods being rotatably mounted in the vicinity of its respective center;
   said tool changer comprising two grippers for gripping two holders to be conveyed between a magazine position having an angular orientation and a working position having an angular orientation at said spindle, said gripper being mounted on certain of said longitudinal and transverse rods such that upon rotation of the longitudinal rods said grippers are conveyed between said magazine position and working position while maintaining said gripped tool holders in their angular orientation.

2. The machine tool of claim 1, wherein the grippers are mounted on the transverse rods.

3. The machine tool of claim 1, wherein shafts are provided on which the longitudinal rods are rotatably mounted, said shafts being offset in parallel fashion so that at least in an initial position, in which one transverse rod is in the vicinity of the working position and the other transverse rod in the vicinity of the magazine position, the transverse and longitudinal rods constitute an articulated parallelogram.

4. The machine tool of claim 2, wherein shafts are provided on which the longitudinal rods are rotatably mounted, said shafts being offset in parallel fashion so that at least in an initial position, in which one transverse rod is in the vicinity of the working position and the other transverse rod in the vicinity of the magazine position, the transverse and longitudinal rods constitute an articulated parallelogram.

5. The machine tool of claim 3, wherein the spacing between the parallel shafts is in the range between one-half and one-quarter the length of the longitudinal rods.

6. The machine tool of claim 4, wherein the spacing between the parallel shafts is in the range between one-half and one-quarter the length of the longitudinal rods.

7. The machine tool of claim 3, wherein the shafts are tilted with respect to the horizontal such that the transverse rods are oriented vertically.

8. The machine tool of claim 6, wherein the shafts are tilted with respect to the horizontal such that the transverse rods are oriented vertically.

9. The machine tool of claim 8, wherein the shafts are tilted in a range between 10–30 degrees.

10. The machine tool of claim 1, wherein the ratio between the length of the longitudinal rods and the length of the transverse rods is between 2 and 4.

11. The machine tool of claim 3, wherein the shafts are joined by a coupling member.

12. The machine tool of claim 3, wherein the longitudinal rods are drive-coupled to one another.

13. The machine tool of claim 11, wherein the longitudinal rods are coupled by a gear drive train.

14. The machine tool of claim 13, wherein the gear drive train has a central toothed roller as well as two gears which are rigidly joined respectively to the two longitudinal rods and mesh with the central toothed roller.

15. The machine tool of claim 14, wherein the gear drive train has a central toothed roller as well as two gears which are rigidly joined respectively to the two longitudinal rods and mesh with the central toothed roller.

16. The machine tool of claim 15, wherein the central toothed roller is mounted rotatably on the coupling member.

17. The machine tool of claim 11, wherein the coupling member is hollow.

18. The machine tool of claim 11, wherein the coupling member is configured to further act as a spray shield.

19. The machine tool of claim 3, wherein the spacing between the parallel shafts is one-third the length of the longitudinal rods.

20. The machine tool of claim 4, wherein the spacing between the parallel shafts is one-third the length of the longitudinal rods.

21. The machine tool of claim 8, wherein the shafts are tilted by 20 degrees.

22. The machine tool of claim 1, wherein the ratio between the length of the longitudinal rods and the length of the transverse rods is 3.

* * * * *

UNITED STATES PATENT AND TRADEMARK OFFICE
CERTIFICATE OF CORRECTION

PATENT NO. : 5,855,541
DATED : January 5, 1999
INVENTOR(S) : Eugene Rutschule

It is certified that error appears in the above-identified patent and that said Letters Patent is hereby corrected as shown below:

On the title page, item [30]:
Foreign Application Priority Data Number should be -- 196 00 055.6 --

Signed and Sealed this

Twenty-second Day of June, 1999

Attest:

Q. TODD DICKINSON

*Attesting Officer*    Acting Commissioner of Patents and Trademarks